United States Patent [19]

Lindmark

[11] Patent Number: 4,548,962
[45] Date of Patent: Oct. 22, 1985

[54] RUBBERIZED ASPHALTIC CONCRETE COMPOSITION

[75] Inventor: Gustaf Lindmark, Botsmark, Sweden

[73] Assignee: All Seasons Surfacing Corporation, Bellevue, Wash.

[21] Appl. No.: 611,518

[22] Filed: May 17, 1984

Related U.S. Application Data

[63] Continuation-in-part of Ser. No. 335,582, Dec. 29, 1981, abandoned.

[51] Int. Cl.$^4$ .............................................. C08L 95/00
[52] U.S. Cl. ................................ 523/220; 106/281 R; 524/59; 524/71; 524/8
[58] Field of Search .............. 106/281 R; 524/59, 8, 524/71; 523/220

[56] References Cited

U.S. PATENT DOCUMENTS

| | | | |
|---|---|---|---|
| 2,807,596 | 9/1957 | Flickinger | 524/71 |
| 2,863,841 | 12/1958 | Bernier et al. | 524/59 |
| 2,978,351 | 4/1961 | Pullar | 524/71 |
| 3,849,355 | 11/1974 | Yamaguchi et al. | 524/71 |
| 4,332,620 | 6/1982 | Quinn | 523/220 |

FOREIGN PATENT DOCUMENTS

| | | | |
|---|---|---|---|
| 2930376 | 3/1980 | Fed. Rep. of Germany | 524/71 |
| 2462459 | 3/1981 | France | 106/281 R |
| 0069924 | 6/1977 | Japan | 106/281 R |
| 1407229 | 9/1975 | United Kingdom | 106/281 R |

*Primary Examiner*—William R. Dixon, Jr.
*Assistant Examiner*—Steven Capella
*Attorney, Agent, or Firm*—Christensen, O'Connor Johnson & Kindness

[57] ABSTRACT

A rubberized asphaltic concrete composition in which the particle sizes of the rubber granulate and the mineral aggregate are adjusted so that a relatively typical particle distribution is achieved in the total aggregate.

15 Claims, No Drawings

RUBBERIZED ASPHALTIC CONCRETE COMPOSITION

This application is a continuation-in-part application based on prior copending application Ser. No. 335,582, filed Dec. 29, 1981, now abandoned.

BACKGROUND OF THE INVENTION

The present invention relates to an improved rubberized asphaltic concrete composition that is more durable, longer lasting, less prone to destructive oxidation, more resilient, and less prone to icing than prior asphaltic concrete compositions, including prior rubberized asphaltic concrete compositions.

SUMMARY OF THE INVENTION

The present invention provides an asphaltic concrete composition comprising a rubber granulate, a mineral aggregate and an asphaltic binder. The majority of the granules making up the rubber granulate are in the size range of from $\frac{1}{4}$ inch to No. 10 U.S. Sieve size. The mineral aggregate is composed of particles distributed in size from about $\frac{3}{4}$ inch to less than No. 200 U.S. Sieve size. The mineral aggregate particles making up the size range from $\frac{1}{4}$ inch to No. 10 are reduced in quantity relative to a normal particle distribution and replaced by rubber granulate of similar size distribution. The asphaltic binder can be any of a variety of conventionally available materials.

DETAILED DESCRIPTION OF THE INVENTION

Any of a variety of commercially available asphalts can be employed in accordance with the present invention. The asphalt content of the asphaltic concrete composition made in accordance with the invention is normally from 1½ to 2 percent higher than that encountered with conventional prior art compositions. It is generally preferred that the asphaltic binder comprise from about 6 to about 12 percent by weight of the composition. It is most preferred that the asphalt comprise from about 7.5 to about 9.5 percent by weight. It is also generally preferred that the rubber granulate comprise from about 1 to about 6 percent by weight of the composition. The rubber granulate most preferably comprises from about 3 to about 3.5 percent by weight. It is further generally preferred that the mineral aggregate be present in the range of from 82 to 93 percent by weight, while it is most preferred that the mineral aggregate comprise from about 87 to about 89.5 percent of the composition. All percentages herein are by weight based on the total weight of the composition unless otherwise noted.

With the exception of the variations outlined below, conventional mix design and preparation techniques can be employed in formulating the asphaltic concrete of the present invention. The mix design methods, for example, that are disclosed in Mix Design Methods for Hot Mix Asphalt Paving published by the Asphalt Institute, are satisfactory. These design methods include the Marshall or Hveem Methods. In using these methods, the compaction mold as well as the tamping foot should be lightly greased to break any bond between the mold and the mixture being tested. Filter papers should not be used. The compaction mold assembly and the compaction hammer should be preheated to about 285° F. to 300° F.

Bulk density determination and specific gravity can be controlled by standard methods. When calculating the average or combined specific gravity of the mix being tested, a specific gravity of approximately 1.19 g/cm should be used for the rubber granulate. The asphaltic concrete of the present invention has a low void and high asphalt content. Experience has shown that the rubber granulate changes the behavior of the asphaltic concrete relative to conventional compositions. Tests of the composition of the present invention will yield low stability and high flow values. These conventional asphalt tests have been found to be inappropriate for the present invention. For the present invention, the void content is of major importance. The void content of the mix should normally lie between about 1 percent by volume ot 3 percent by volume for light to medium traffic conditions and from 2 to about 4 percent by volume for heavy traffic, although void content up to about 5 percent can be tolerated without a serious degradation of performance. If the mix does not meet these specifications, the filler content should be adjusted and a new test performed. If the desired void content has not been obtained, the asphalt content should be adjusted. For example, to decrease the void content, the asphalt content must be increased. Control of compaction in the field is made by analyzing cores or by the use of nuclear density gauges. Again, the void content of these cores should lie between about 1 to 3 percent by volume for light to medium traffic and between about 2 to about 5 percent for heavy traffic.

The asphaltic concrete of the present invention can be produced by any of the conventional batch, drum or continuous methods. For example, the following batch procedure for combining the rubber granulate, mineral aggregate and asphalt is typical of the method that can be employed. The aggregate is first heated to a temperature in the range of from 325° F. to 375° F. The rubber granulate is thereafter added to the hot aggregate before the liquid asphalt is added to the mix. The combined aggregate including the granulate is mixed for about 15 seconds. Thereafter, the requisite amount of the asphalt chosen for the desired end formulation is added and the combined mixture for the conventional time. The asphaltic concrete composition of the present invention can be stored in hot bins for up to 24 hours before delivery to the construction site. As the material is being delivered, it is preferred that the delivery vehicles be covered to prevent surface cooling of the asphaltic concrete composition. The temperature of the mixture upon delivery to the construction site should be in the range of from 280° F. to 350° F., depending upon the particular asphalt type chosen for the given composition.

Before the asphaltic concrete composition of the present invention is placed, it is preferred that the surface to be covered be well cleaned. It is also preferred that a thick tackcoat be applied to the surface prior to application of the composition. Up to 0.1 gallon per square yard of tackcoat can be employed. Conventional paving equipment can be utilized to apply the asphaltic concrete composition. It is preferred that the composition be applied at a temperature of about 300° F. Once the composition is applied to the surface, compaction should begin as soon as possible. The compaction procedure should be continued until the pavement has cooled and elastic movement of the composition can no longer be observed. Temperature of the composition at this point is usually on the order of 140° F.

The rubber granules utilized for the asphaltic concrete of the present invention preferably comprise rubber granules and cord fibers ground from worn and discarded rubber vehicle tires. Any type of passenger vehicle or truck tire can be employed to produce the rubber granule for use with the present invention. Presence of tire cord particles is not detrimental but, in fact, increases the tensile strength of the mix produced in accordance with the present invention. In accordance with the present invention, it is preferred that the majority of the particles comprising the rubber granulate fall between $\frac{1}{4}$ inch and No. 10 U.S. Sieve size, that is, greater than about 50 percent of the rubber granules fall in the size range of from $\frac{1}{4}$ inch to No. 10. It is generally satisfactory if from 58 to 75 percent of the rubber granules fall within that size range. It is most preferred that the particle sizes for the rubber granulate be distributed such that 100 percent of the granulate is less than $\frac{1}{4}$ inch, from 76 to 100 percent of the granulate is less than No. 4 U.S. Sieve size, from 28 to 42 percent of the granulate is less than No. 10 U.S. Sieve size, and 16 to 24 percent of the granulate is less than No. 20 U.S. Sieve size.

The quality of the mineral aggregate utilized in accordance with the present invention is substantially the same as that used in the conventional asphaltic mixtures. During processing, however, the amount of $\frac{1}{4}$ inch to No. 10 Sieve size material, that is that material falling between the particle sizes of $\frac{1}{4}$ inch and No. 10, is reduced to provide space for the rubber granules, the majority of which fall within the $\frac{1}{4}$ inch to No. 10 size. The mineral aggregate particles making up the size range from $\frac{1}{4}$ inch to No. 10 are reduced in quantity relative to a uniform particle distribution and are replaced by the rubber granulate of similar size distribution relative to the removed aggregate. This reduction of mineral aggregate is called "gap grading." The effect of gap grading is to have the rubber granulate replace part of the mineral aggregate and function as aggregate within the mixture, creating a resilient, long lasting pavement. This adjustment to the combined aggregate allows the final product to be compacted to the low air void contents as required by the present invention. Gap grading is an essential part of the invention, for without it, the mixture would be non-homogenous and the rubber granulate would resist compaction and the result would be a poor quality pavement.

The actual gradation of the mineral aggregate depends upon the maximum particle size employed for a particular asphaltic mix design. The following table gives three preferred gradations for asphaltic concrete mixes made in accordance with the present invention that employ a maximum mineral aggregate size of $\frac{3}{8}$ inch, $\frac{5}{8}$ inch and a $\frac{3}{4}$ inch respectively.

| Sieve Size | Gradation 1 ($\frac{3}{8}$") % Passing | Gradation 2 ($\frac{5}{8}$") % Passing | Gradation 3 ($\frac{3}{4}$") % Passing |
|---|---|---|---|
| $\frac{3}{4}$-in | | | 100 |
| $\frac{5}{8}$-in | | 100 | |
| $\frac{3}{8}$-in | 100 | 60–80 | 50–62 |
| $\frac{1}{4}$-in | 60–80 | 30–44 | 30–44 |
| No. 10 | 23–38 | 20–32 | 20–32 |
| No. 30 | 15–27 | 13–25 | 12–23 |
| No. 200 | 8–12 | 8–12 | 7–11 |

Of course, the maximum particle size in the asphalt mix designed in accordance with the present invention dictates the minimum thickness to which the final composition is laid to form a road surfacing. The preferred minimum thicknesses for the composition containing the Gradation 1 material is 1 inch, for the Gradation 2 material is 1½ inch, and for the Gradation 3 material is 1¾ inch.

While the present invention has been described in conjunction with preferred embodiments and variations thereof, one of ordinary skill after reading the foregoing specification, will be able to effect various changes, substitution of equivalents and other alterations while maintaining the gap grading to allow appropriate space for the rubber granulate without departing from the broad concepts disclosed herein. It is therefore, intended that the scope of Letters Patent granted hereon be limited only by the definition contained in the appended claims and equivalents thereof.

The embodiment of the invention in which an exclusive property or privilege is claimed are defined as follows:

1. An asphaltic composition consisting essentially of:
   1 to 6 percent by weight of rubber granulate, the majority of which comprises granules in the size range of from $\frac{1}{4}$ inch to No. 10 U.S. Sieve size,
   82 to 93 percent by weight of mineral aggregate composed of particles wherein 100 percent of said particles are less than $\frac{3}{8}$ inch, 50 to 62 percent are less than $\frac{3}{8}$th inch, 30 to 44 percent are less than $\frac{1}{4}$ inch, 20 to 32 percent are less than No. 10 U.S. Sieve size, 12 to 23 percent are less than No. 30 U.S. Sieve size and 7 to 11 percent are less than No. 200 U.S. Sieve size, the particles in the size range from $\frac{1}{4}$ inch to No. 10 U.S. Sieve size thereby being reduced by an amount substantially equal in volume to the amount of said rubber granulate to receive in admixture said rubber granulate to form a total aggregate mixture, and
   6 to 12 percent by weight of asphalt binder.

2. The composition of claim 1 wherein said composition comprises from 87 percent to 89.5 percent mineral aggregate, from 3 percent to 3.5 percent rubber granulate, and from 7.5 percent to 9.5 percent asphaltic binder.

3. The composition of claim 1 wherein 100 percent of the rubber granulate is less than $\frac{1}{4}$ inch, from 76 to 100 percent of the rubber granulate is less than No. 4 U.S. Sieve size, from 28 to 42 percent of the rubber granulate is less than No. 10 U.S. Sieve size, and 16 to 24 percent of the rubber granulate is less than No. 20 U.S. Sieve size.

4. The composition of claim 1 wherein 58 percent to 72 percent by weight of the rubber granulate falls within the $\frac{1}{4}$ inch to 10 mesh size range.

5. The composition of claim 1 wherein the void content of the composition is in the range of from 1 to 5 percent after compaction.

6. An asphaltic composition consisting essentially of:
   1 to 6 percent by weight of rubber granulate, the majority of which comprises granules in the size range of from $\frac{1}{4}$ inch to No. 10 U.S. Sieve size,
   82 to 93 percent by weight of mineral aggregate composed of particles wherein 100 percent of said particles are less than 3/8th inch, 60 to 80 percent are less than $\frac{1}{4}$ inch, 23 to 38 percent are less than No. 10 U.S. Sieve size, 15 to 27 percent are less than No. 30 U.S. Sieve size, and 8–12 percent are less than No. 200 U.S. Sieve size, the particles in the size range from $\frac{1}{4}$ inch to No. 10 U.S. Sieve size thereby being reduced by an amount substantially equal in volume to the amount of said rubber granulate to receive in admixture said rubber granulate to form a total aggregate mixture, and 6 to 12 percent by weight of asphalt binder.

7. The composition of claim 6 wherein said composition comprises from 87 percent to 89.5 percent mineral aggregate, from 3 percent to 3.5 percent rubber granulate, and from 7.5 to 9.5 percent asphaltic binder.

8. The composition of claim 7 wherein 100 percent of the rubber granulate is less than ¼ inch, from 76 to 100 percent of the rubber granulate is less than No. 4 U.S. Sieve size, from 28 to 42 percent of the rubber granulate is less than No. 10 U.S. Sieve size, and 16 to 24 percent of the rubber granulate is less than No. 20 U.S. Sieve size.

9. The composition of claim 1 wherein 58 percent to 72 percent by weight of the rubber granulate falls within the ¼ inch to 10 mesh size range.

10. The composition of claim 5 wherein the void content of the composition is in the range of from 1 to 5 percent after compaction.

11. An asphaltic composition consisting essentially of:
1 to 6 percent by weight of rubber granulate, the majority of which comprises granules in the size range of from ¼ inch to No. 10 U.S. Sieve size,
82 to 93 percent by weight of mineral aggregate composed of particles wherein 100 percent of said particles are less than ⅝ inch, 60 to 80 percent are less than ⅜ inch, 30 to 44 percent are less than ¼ inch, 20 to 32 percent are less than No. 10 U.S. Sieve size, 13 to 25 percent are less than No. 30 U.S. Sieve size, and 8 to 12 percent are less than No. 200 U.S. Sieve size, the particles in the size range from ¼ inch to No. 10 U.S. Sieve size thereby being reduced by an amount substantially equal in volume to the amount of said rubber granulate to receive in admixture said rubber granulate to form a total aggregate mixture, and 6 to 12 percent by weight asphalt binder.

12. The composition of claim 11 wherein said composition comprises from 87 percent to 89.5 percent mineral aggregate, from 3 percent to 3.5 percent rubber granulate, and from 7.5 percent to 9.5 percent asphaltic binder.

13. The composition of claim 11 wherein 100 percent of the rubber granulate is less than ¼ inch, from 76 to 100 percent of the rubber granulate is less than No. 4 U.S. Sieve size, from 28 to 42 percent of the rubber granulate is less than No. 10 U.S. Sieve size, and 16 to 24 percent of the rubber granulate is less than No. 20 U.S. Sieve size.

14. The composition of claim 11 wherein 58 percent to 72 percent by weight of the rubber granulate falls within the ¼ inch to 10 mesh size range.

15. The composition of claim 11 wherein the void content of the composition is in the range of from 1 to 5 percent after compaction.

* * * * *